United States Patent [19]

Neefe

[11] Patent Number: 4,636,338
[45] Date of Patent: * Jan. 13, 1987

[54] MOLDING TORIC CONTACT LENSES USING A DIRECTED STREAM OF GAS

[76] Inventor: Charles W. Neefe, 811 Scurry St. P.O. Box 429, Big Spring, Tex. 79720

[*] Notice: The portion of the term of this patent subsequent to Jul. 10, 2001 has been disclaimed.

[21] Appl. No.: 690,943

[22] Filed: Jan. 11, 1985

[51] Int. Cl.$^4$ .............................................. B29D 11/00
[52] U.S. Cl. ........................................ 264/2.1; 264/1.1; 264/85; 264/310; 264/500
[58] Field of Search .................... 264/2.1, 1.4, 1.1, 85, 264/310, 311, 500, 503

[56] References Cited

U.S. PATENT DOCUMENTS

| | | | |
|---|---|---|---|
| 2,302,020 | 11/1942 | Frederick, Jr. | 264/500 |
| 3,454,686 | 7/1969 | Jones | 264/1.4 |
| 3,660,545 | 5/1972 | Wichterle | 264/2.1 |
| 3,691,263 | 9/1972 | Stoy et al. | 264/2.1 |
| 3,699,089 | 10/1972 | Wichterle et al. | 264/2.1 |
| 4,459,246 | 7/1984 | Neefe | 264/2.1 |

*Primary Examiner*—James Lowe

[57] ABSTRACT

The lens is molded in a rotating concave lens mold. Liquid lens monomer is placed in the concave mold and a controlled stream of gas from a narrow opening extending across the lens and positioned over the lens center shapes the concave surface to a toric. The lens mold and the gas nozzle rotate in synchronization until the lens monomer is polymerized.

15 Claims, 2 Drawing Figures

MOLDING TORIC CONTACT LENSES USING A DIRECTED STREAM OF GAS

PRIOR ART

The molding of contact lenses dates back to the very beginning of the art. Compression molding, casting, injection molding, spin casting and transfer molding have all been used to produce contact lenses with varying degrees of success. The bulk of lenses produced today are either made by spin casting or lathe cut and polished.

DESCRIPTION OF THE INVENTION

The present invention employs a controlled stream of gas to provide a toric shape to the concave lens surface. The gas is directed at two points near the edge of the liquid lens monomer and forms a concave toric surface by displacing the liquid. The monomer is allowed to polymerize while being held in the required toric shape by the force exerted o the liquid lens surface by the stream of pressurized gas. The convex lens surface is molded against the concave surface of the lens mold.

IN THE DRAWINGS

THE LENSES ARE MADE AS FOLLOWS

Figures 1, 2:
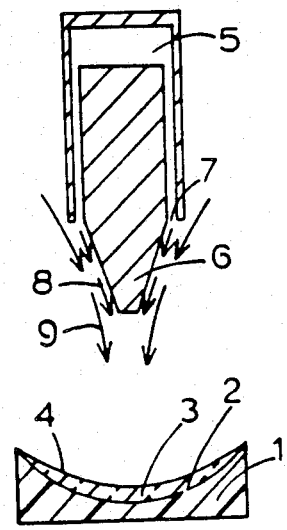
FIG. 1 shows the lens mold with the liquid monomer, in section.
FIG. 2 shows the polymerized lens in place with the air stream on, in section.

A source of filtered and precisely pressure regulated inert gas such as nitrogen must be provided.

The nozzle which directs the gas toward the concave lens surface should be of the transvector type as supplied by the Vortec Corporation.

The radius of the concave surface may be controlled in two ways: (1) by changing the pressure of the gas (2) by changing the distance from the cone to the lens surface.

A selected liquid lens monomer is prepared with sufficient catalyst to achieve polymerization. The liquid monomer 3 FIG. 1 is placed in the concave lens mold 1 FIG. 1 and the liquid assumes the curvature of the concave surface 2 FIG. 1. The gas nozzle 6 FIG. 2 is directed at the center of the concave lens mold 1 FIG. 2. A filtered and precisely pressure controlled inert gas is supplied to chamber 5 FIG. 1. Gas under pressure escapes through the circular gas nozzle 7 FIG. 2 around the base of the cone 6 FIG. 2. The gas 8 FIG. 2 travels toward the smaller end of the cone and increases in velocity as the cone becomes smaller in diameter. Induction and entrainment take place outside the cone area 9 FIG. 2. The gas is thus focused or condensed to a small area at the end of the cone 6 FIG. 2. The focused gas stream is directed at the center of the lens mold 1 FIG. 2 and displaces the liquid surface 4 FIG. 2, producing the required lens shape. The liquid lens monomer is allowed to polymerize to form the lens 3 FIG. 2. The convex lens surface being molded against the mold surface 2 FIG. 2 and the concave lens surface being formed by the inert gas, displacing the liquid and forming the concave surface 4 FIG. 2. The finished lens is removed from the mold for final inspections.

Gas shaping of the concave surface may be used in combination with spin casting to achieve better control of the concave curvature. Small ripples have been seen on the concave surface of the lens monomer during the beginning stages of polymerization. These ripples on the monomer are due to gas currents and they totally disappear as polymerization proceeds and the viscosity of the monomer increases and becomes a solid.

The stream of compressed gas may be directed away from the center and toward the edge of a spin cast lens through multiple gas nozzles to control the peripheral curvature. Spin cast lenses have an aspheric concave surface having a longer radius toward the edge which may be altered to a sphere by directing compressed gas toward the revolving peripheral area of the lens. This may also be accomplished by multiple streams or a ring of gas directed toward the periphery of the revolving lens.

Toric concave surfaces are produced by having two streams of gas located approximately one fourth the lens diameter from the lens edge and positioned 180° apart. The streams of gas are rotated in synchronization with the rotating lens whereby they remain in the same location above the rotating lens surface.

A single jet of controlled gas emerging from a straight narrow opening extending across the lens and positioned above the lens center and rotating with the lens provides a toric concave surface by spin casting. The width of the slot may be changed to provide different amounts of toricity. Changes in the pressure and the velocity of the gas also provides different degrees of toricity.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scope of the invention, it is intended that all matter contained in the above description shall be interpreted as illustrative and not in a limiting sense.

I claim:

1. A method of molding a contact lens having a convex surface molded against a concave lens mold and a toric concave lens surface shaped by a stream of compressed gas released through a nozzle and directed at the liquid monomer and the gas pressure displaces the liquid lens monomer to form the concave toric lens surface and allowing the liquid monomer to polymerize and form a solid toric contact lens.

2. A method of molding a contact lens having a convex surface molded against a rotating concave lens mold and a toric concave lens surface shaped by a stream of compressed gas released through a gas nozzle rotating and synchronized with the rotating concave lens mold and directed at the liquid lens monomer and the gas pressure displaces the rotating liquid lens monomer to form the concave toric lens surface and allowing the rotating liquid lens monomer to polymerize and form a solid toric contact lens.

3. A method of molding a contact lens having a convex surface molded against a rotating concave lens mold and a toric concave lens surface shaped by a stream of compressed gas released through a gas nozzle extending across the lens and positioned over the lens center and rotating and synchronized with the rotating concave lens mold and the released gas is directed at the liquid lens monomer and the gas pressure displaces the rotating liquid lens monomer to form the concave toric liquid surface and allowing the rotating liquid lens monomer to polymerize and form a solid toric contact lens.

4. A method of molding a contact lens as in claim 1 wherein the compressed gas is directed through a narrow opening extending across the lens.

5. A method of molding a contact lens as in claim 1 wherein the lens mold and the gas nozzle are rotated around the lens optical axis while the lens is being gas molded.

6. A method of molding a contact lens as in claim 1 wherein the lens mold is rotated around the lens optical axis and the compressed air is directed at two points 180° apart on the lens surface.

7. A method of molding a lens as in claim 4 wherein multiple gas nozzles are used.

8. A method of molding a lens as in claim 1 wherein the gas nozzle is a opening extending across the lens and positioned over the lens center.

9. A method of molding a contact lens as in claim 2 wherein the compressed gas is directed through a narrow nozzle extending across the lens and positioned over the lens center.

10. A method of molding a contact lens as in claim 2 wherein the lens mold and the gas nozzle are rotated around the lens optical axis while the lens is being gas molded.

11. A method of molding a lens as in claim 2 wherein multiple gas nozzles are used.

12. A method of molding a lens as in claim 2 wherein the gas nozzle is a opening extending across the lens and positioned over the lens center and rotated with the lens mold while the lens is being polymerized.

13. A method of molding a contact lens as in claim 3 wherein the lens mold and the gas nozzle are rotated around the lens optical axis while the lens is being gas molded.

14. A method of molding a contact lens as in claim 3 wherein the lens mold and the gas nozzle are rotated around the lens optical axis while the lens is being gas molded.

15. A method of molding a contact lens as in claim 3 wherein the lens mold is rotated around the lens optical axis.

* * * * *